C. D. BROWN.
Transplanting Hedge-Plants.
No. 61,150. Patented Jan. 15, 1867.
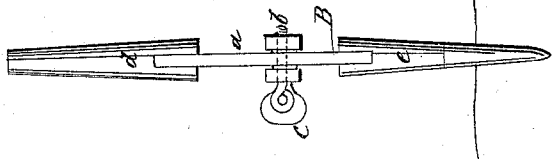
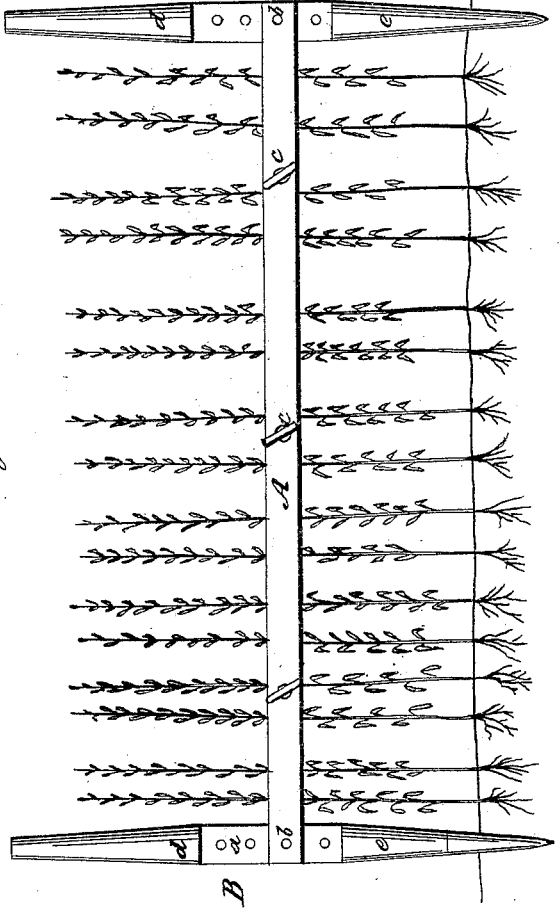
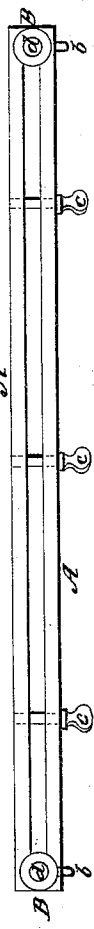
Witnesses:
R. J. Campbell
Edw Schafer
Inventor:
C. D. Brown
by
Mason Fenwick & Lawrence

United States Patent Office.

C. D. BROWN, OF STERLING, ILLINOIS.

Letters Patent No. 61,150, dated January 15, 1867.

---

IMPROVEMENT IN DEVICE FOR PLANTING HEDGES.

---

*The Schedule referred to in these Letters Patent and making part of the same.*

---

TO ALL WHOM IT MAY CONCERN:

Be it known that I, C. D. BROWN, of Sterling, in the county of Whitesides, and State of Illinois, have invented an improved Device for Planting Hedges; and I do hereby declare that the following is a full, clear, and exact description thereof, reference being had to the accompanying drawings, making a part of this specification, in which—

Figure 1 is a side elevation of the planting device, represented as sustaining a row of plants in upright position.

Figure 2 is an end view of the same device.

Figure 3 is a top view.

Similar letters of reference indicate corresponding parts in the several figures.

This invention relates to a new and improved device, which is designed for assisting in the operation of planting hedges of the Osage orange in regular rows, as will be hereinafter described.

To enable others skilled in the art to understand my invention, I will describe its construction and operation.

In the accompanying drawings, A A represent two narrow beams or planks, which may be made of any suitable length that will be convenient for handling. The ends of the beams A A are pivoted on each side of metal plates $a\ a$ by means of clamping-screws $b\ b$; and at intermediate points between the thin metal strips $a\ a$ clamp-screws $c\ c$ are applied to the beams, at regular intervals apart, for the purpose of setting the beams nearer together or further apart, as circumstances require. The plates $a\ a$ are secured at their ends to the wooden portions $d$ and $e$, so as to form posts or stakes for supporting the beams A A at any required height from the ground. The lower pieces $e\ e$ are pointed, and may be shod with metal, for the purpose of entering the ground and sustaining the posts in upright position, as shown in the drawings, figs. 1 and 2. Several holes may be made through the intermediate metal plates or posts B B, for receiving the screw-pins $b\ b$, and admitting of the adjustment of the beams A at different heights, according to the height of the plants.

The manner of using the device is as follows: The beams A A are detached from the posts and from each other, and one of these beams is laid upon the ground, and upon it the plants are arranged at proper distances apart for planting. The other beam A is then laid upon the first, so that the plants are between the two beams, as shown in fig. 1. The beams are then clamped together and secured to the posts B, as above described, after which the whole are erected and secured in place over the furrow which is made for receiving the roots of the plants. The device which I have described serves as a frame for supporting and keeping the plants in place and in an upright position during the operation of setting them in the ground, so that when their roots are covered with earth, and the posts and beams removed, the plants will be left standing just as the farmer requires them. I do not desire to confine my invention to the precise construction of the planting device herein described, as the construction may be modified and varied, as circumstances require, without changing the principle of my invention.

Having described my invention, what I claim as new, and desire to secure by Letters Patent, is—

1. The employment of clamping-beams A A and posts B B in the operation of planting hedges, substantially as described.

2. Providing for adjusting the beams or clamps A A vertically as well as horizontally, substantially as described.

C. D. BROWN.

Witnesses:
DANIEL FOY,
AUSTIN T. FOY.